(12) United States Patent
Benner et al.

(10) Patent No.: US 9,766,110 B2
(45) Date of Patent: Sep. 19, 2017

(54) FILLING LEVEL INDICATOR

(71) Applicants: Hans-Guenter Benner, Kriftel (DE); Bernd Pauer, Eppstein (DE)

(72) Inventors: Hans-Guenter Benner, Kriftel (DE); Bernd Pauer, Eppstein (DE)

(73) Assignee: Continental Automotive GmbH, Hannover (DE)

( * ) Notice: Subject to any disclaimer, the term of this patent is extended or adjusted under 35 U.S.C. 154(b) by 454 days.

(21) Appl. No.: 14/366,337

(22) PCT Filed: Dec. 18, 2012

(86) PCT No.: PCT/EP2012/075937
§ 371 (c)(1),
(2) Date: Jun. 18, 2014

(87) PCT Pub. No.: WO2013/092577
PCT Pub. Date: Jun. 27, 2013

(65) Prior Publication Data
US 2014/0331765 A1    Nov. 13, 2014

(30) Foreign Application Priority Data

Dec. 19, 2011    (DE) .......................... 10 2011 088 949

(51) Int. Cl.
*G01F 23/30* (2006.01)
*G01F 23/36* (2006.01)

(52) U.S. Cl.
CPC ............ *G01F 23/30* (2013.01); *G01F 23/363* (2013.01)

(58) Field of Classification Search
CPC .................................. G01F 23/30; G01F 23/36
See application file for complete search history.

(56) References Cited

U.S. PATENT DOCUMENTS

| | | | |
|---|---|---|---|
| 6,401,533 B1 | 6/2002 | Gier et al. | |
| 7,584,658 B2 | 9/2009 | Benner et al. | |
| 2006/0000279 A1 | 1/2006 | Jamnia et al. | |
| 2007/0074568 A1 | 4/2007 | Benner et al. | |
| 2007/0107503 A1* | 5/2007 | Benner ................... | G01F 23/36 73/114.54 |

(Continued)

FOREIGN PATENT DOCUMENTS

| | | |
|---|---|---|
| CN | 1906464 | 1/2007 |
| CN | 201269770 | 7/2009 |

(Continued)

*Primary Examiner* — Erika J Villaluna
(74) *Attorney, Agent, or Firm* — Cozen O'Connor

(57) ABSTRACT

A filling level indicator includes a retainer, a bow rotatably supported on the retainer and having a lever arm fastened thereto, a float fastened to the lever arm, and a filling level sensor arranged in the retainer. The filling level sensor has a substrate, a resistance network arranged thereon, a contact spring structure, and a cover, connected to the substrate, that covers the resistance network and the contact spring structure. A magnet is connected to the bow or the lever arm and acts on the contact spring structure such that an electrical signal corresponding to the filling level is generated according to the pivoting range. The mount has a wall thickness that can be penetrated by the magnetic field of the magnet, and so metal particles are held on the outside of the mount by the magnetic field of the magnet.

9 Claims, 4 Drawing Sheets

(56) References Cited

U.S. PATENT DOCUMENTS

2010/0207610 A1* 8/2010 Benner ................ G01F 23/363
                                                        324/207.13

FOREIGN PATENT DOCUMENTS

| CN | 101802559 | 8/2010 |
| DE | 197 01 246 | 7/1998 |
| DE | 10 2004 004102 | 1/2005 |
| DE | 10 2005 047544 | 5/2007 |
| DE | 10 2008 011713 | 9/2009 |
| JP | 2005-214844 | 8/2005 |

* cited by examiner

FILLING LEVEL INDICATOR

CROSS REFERENCE TO RELATED APPLICATIONS

This is a U.S. national stage of application No. PCT/EP2012/075937, filed on Dec. 18, 2012. Priority is claimed on German Application No.: DE102011088949.3, filed Dec. 19, 2011, the content of which is incorporated herein by reference.

BACKGROUND OF THE INVENTION

1. Field of the Invention

The invention relates to a filling level indicator, comprising a holder, a bracket rotatably mounted thereon and having a lever arm fastened thereto, a float fastened to the lever arm, a filling level sensor arranged in the holder, wherein the filling level sensor has a substrate, a resistor network arranged thereon and a contact spring structure, and also a cover connected to the substrate, which cover covers the resistor network and the contact spring structure, and a magnet arranged in a mount of the bracket and which acts on the contact spring structure such that an electrical signal corresponding to the filling level can be generated according to the pivoting range.

2. Description of Prior Art

Such filling level indicators are known and thus form the prior art (DE 10 2005 047 544 A1). In this respect, the magnet is arranged on the side of the substrate facing away from the thick-film network, wherein the magnet is moved at a small distance over the substrate. The magnet is held on the lever arm or in a bracket connected to the lever arm. If the magnet is arranged in a bracket, the bracket has a mount into which the magnet is inserted. In order to ensure unrestricted pivoting of the bracket parallel to the substrate, the magnet is arranged in the mount on the bracket at a distance from the substrate. It has been shown that, as a result of the movements of the fuel or as a result of movements of the bracket, metal particles in the fuel pass into the region of the magnet, in particular into the gap between the substrate and mount and then, as a result of the magnetic forces, adhere to the magnet or the mount situated in this region. Consequently, as the number of the accumulating metal particles increases, the magnetic forces acting on the contact spring structure decrease. In the worst case, the magnetic forces are no longer sufficient to bring about a deflection of the contact springs for making contact with the resistor network. Consequently, malfunctions of the filling level indicator can occur.

SUMMARY OF THE INVENTION

An object of the invention is to provide a filling level indicator by which the aforementioned disadvantages are avoided.

This object is achieved in that the bracket has a mount for the magnet, wherein the mount has a wall thickness that can be penetrated by the magnetic field of the magnet such that metal particles are held on the outer side of the mount by the magnetic field of the magnet.

The effect of this reduced wall thickness is that a substantially greater magnetic field is present on the outer side of the mount and now allows the metal particles to be held. Consequently, the number of metal particles accumulating in the gap between the substrate and mount is considerably reduced. Interruptions in the contacting between the contact spring structure and the resistor network are reliably avoided in this way.

In an advantageous refinement, the bracket has, in the region of the mount, a wall thickness which is 20% to 50% of the diameter of the magnet.

In an advantageous refinement, a further reduction in the number of metal particles that pass into the gap between the magnet and substrate is achieved in that a disk-shaped widening is arranged in the region of the mount for the magnet on the side of the bracket facing the substrate and parallel to the substrate. With the arrangement of this disk-shaped widening the horizontal length of the gap between the mount of the magnet and substrate is increased by the radial extent of the disk-shaped widening.

Advantageously, the disk-shaped widening has a thickness of 0.5 mm to 3 mm. This small thickness ensures that, as a result of the fuel movements or the movement of the bracket, the particles pass onto the disk-shaped widening and thus into the region of the magnetic field.

The radial extent of the disk-shaped widening can be chosen here to be large enough that, at the radial periphery of the widening, the magnetic field is small enough that it has only a small to negligible influence on the metal particles moved by the fuel. It is thereby avoided that the magnet assists the penetration of the metal particles into the gap. In an advantageous refinement, the disc-shaped widening has a radial extent that is two to four times the diameter of the magnet.

Penetration of the metal particles into the gap can be further prevented in that the disk-shaped widening is at a small distance from the substrate, preferably from 0.1 mm to 1.5 mm. This ensures not only a sufficiently small gap but also unrestricted pivoting of the bracket.

The bracket with the mount and disk-shaped widening can be produced in a particularly simple manner if the disk-shaped widening terminates flush with the side of the mount that faces the substrate.

Since fuel movements in the fuel tank with the associated filling level fluctuations are always associated with a pivoting of the lever arm and thus of the bracket, the movement of the bracket is the primary movement by which the particles in the fuel can pass into the gap between the magnet and substrate. For this reason, according to a further refinement, it is sufficient to form the disk-shaped widening only on the two longitudinal sides of the bracket. The free end of the bracket facing away from the bearing of the bracket is formed only by the mount for the magnet.

Guiding the metal particles from the radially outer edge of the disk-shaped widening to the magnet is facilitated if the widening has a thickness increasing from radially outward in the direction of the bracket, wherein the side of the disk-shaped widening facing the substrate is oriented parallel to the substrate. With this refinement, the disk-shaped widening forms a type of ramp on which the metal particles are conducted by the fuel movements in the direction of the outer side of the mount and thus into the region of the magnetic field on the outer side of the bracket.

In an advantageous refinement, the ramp has an angle of 15°-60°, preferably 20°-45°. The ramp can be designed to extend from radially outward to radially inward up to the bracket, or end, beginning from radially outward, in front of the bracket, so that the ramp has the form of a chamfer. Instead of a rectilinear and easy-to-produce ramp, in another refinement this ramp can have a nonlinear, in particular a concave profile. This design makes it possible for the metal particles to be transferred more easily to the outer side of the mount and thus into the magnetic field.

BRIEF DESCRIPTION OF THE DRAWINGS

The invention will be explained in more detail using a number of exemplary embodiments. In the drawings:

FIGS. 2A to 4A show further embodiments of the filling level indicator.

DETAILED DESCRIPTION OF THE PRESENTLY PREFERRED EMBODIMENTS

Figure 1:
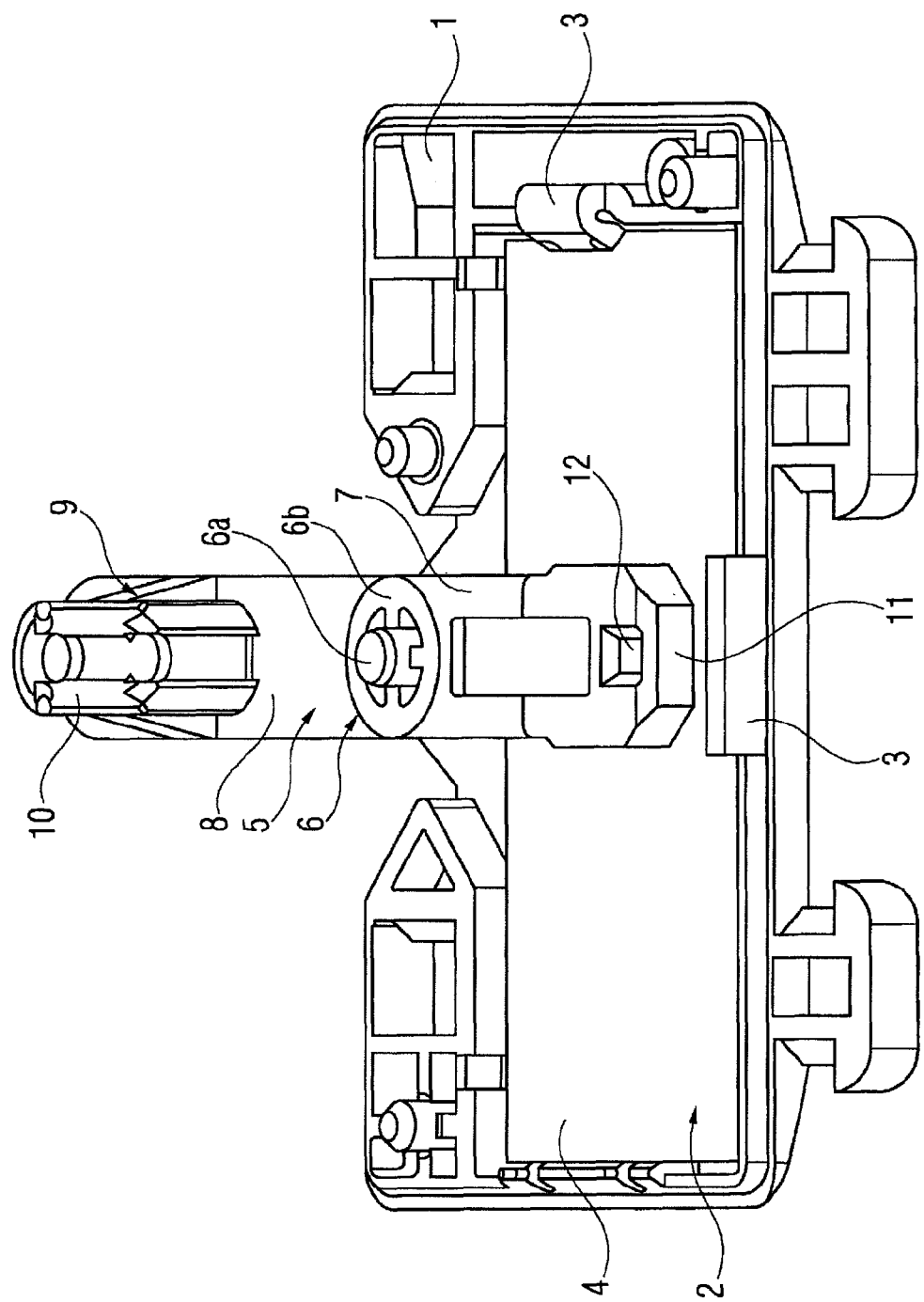
FIG. 1 shows a filling level indicator according to the prior art.

The filling level indicator in FIG. 1 has a holder 1 in which a filling level sensor 2 is clipped by latching hooks 3. The filling level sensor 2 comprises a substrate 4 and a cover connected thereto, which cover, in the illustration shown, faces the holder 1 and can thus not be seen. A bracket 5 has a first arm 7 and a second arm 8 which enclose a central bearing 6 via which the bracket 5 is rotatably mounted in the holder 1. The bracket 5 has a uniform width, wherein the width of the bracket 5 is determined by the bearing pin 6a and the bearing point 6b of the bearing 6. The first arm 7 of the bracket 5 sweeps over the substrate 4 during a rotation of the bracket. The second arm 8 of the bracket 5 has a mount 9 in which a lever arm (not shown) is inserted and is held by latching hooks 10 of the bracket 5. A float is arranged on the free end of the lever arm, with the result that the bracket is moved by the pivoting of the lever arm. The first arm 7 has at its end 11 a mount 12 in which a magnet (not shown) is arranged. During a pivoting movement of the lever arm and the bracket 5, the magnet is moved in an arcuate path above the substrate 4. By the contact springs which are here brought into contact with the resistor network, an electrical signal corresponding to the filling level is thus generated. To ensure free pivoting of the bracket, the bracket 5 and the magnet are arranged at a small distance from the substrate 4, with the result that a gap is formed between the bracket 5 and the substrate 4.

Figure 2:
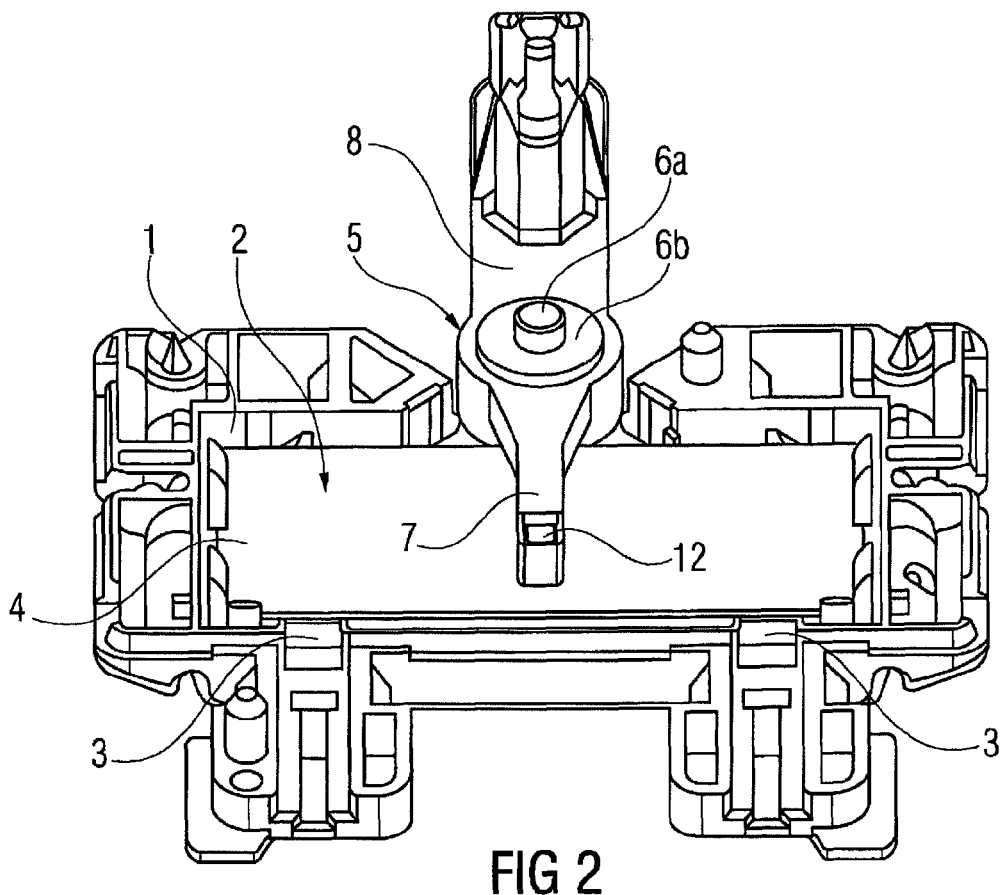
FIG. 2 shows a filling level indicator according to the invention.

FIG. 2 shows the holder 1 with the filling level sensor 2 and the bracket 5. The bracket 5 also has a mount 12 in which the magnet 11 is arranged. However, in contrast with FIG. 1, the bracket 5 is designed such that it has a reduced wall thickness in the region of the mount 12. The wall thickness is in this region approximately 30% of the diameter of the magnet. Consequently, the wall thickness is thin enough to be penetrated by the magnetic field of the magnet. As a result of this magnetic field, metal particles that are flushed by the fuel into this region are held on the outer side of the mount 12, whereby the number of particles that can enter the gap between the bracket 5 and substrate 4 is considerably reduced. The smaller width of the bracket 5 resulting from the reduced wall thickness in the region of the mount 12 does not need to be restricted to the region of the mount. In this refinement, the entire first arm 7 has a smaller width than the second arm 8.

Figure 2A:
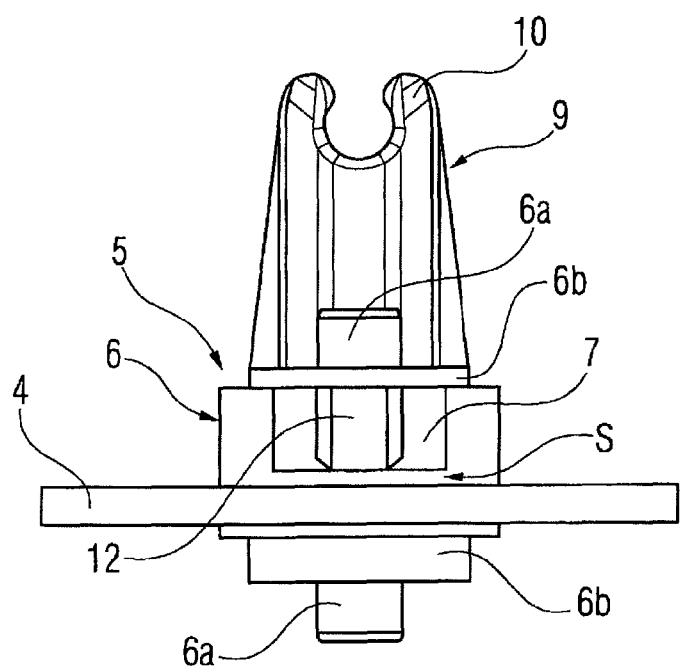

FIG. 2A shows the bracket 5 together with the substrate 4 without the holder in a view from the front. The first arm 7 has a smaller width than the bearing 6 with the bearing pin 6a. The bracket 5 and substrate 4 are arranged in the holder in such a way that a gap S is formed between the mount 12 on the arm 7 and the substrate 4. The lever arm is mounted in the bracket 5 by the latching hooks 10 of the mount 9. The magnet, which cannot be seen, is arranged in the mount 12 such that it terminates flush with the underside of the mount 12 in the direction of the substrate 4.

Figure 3:
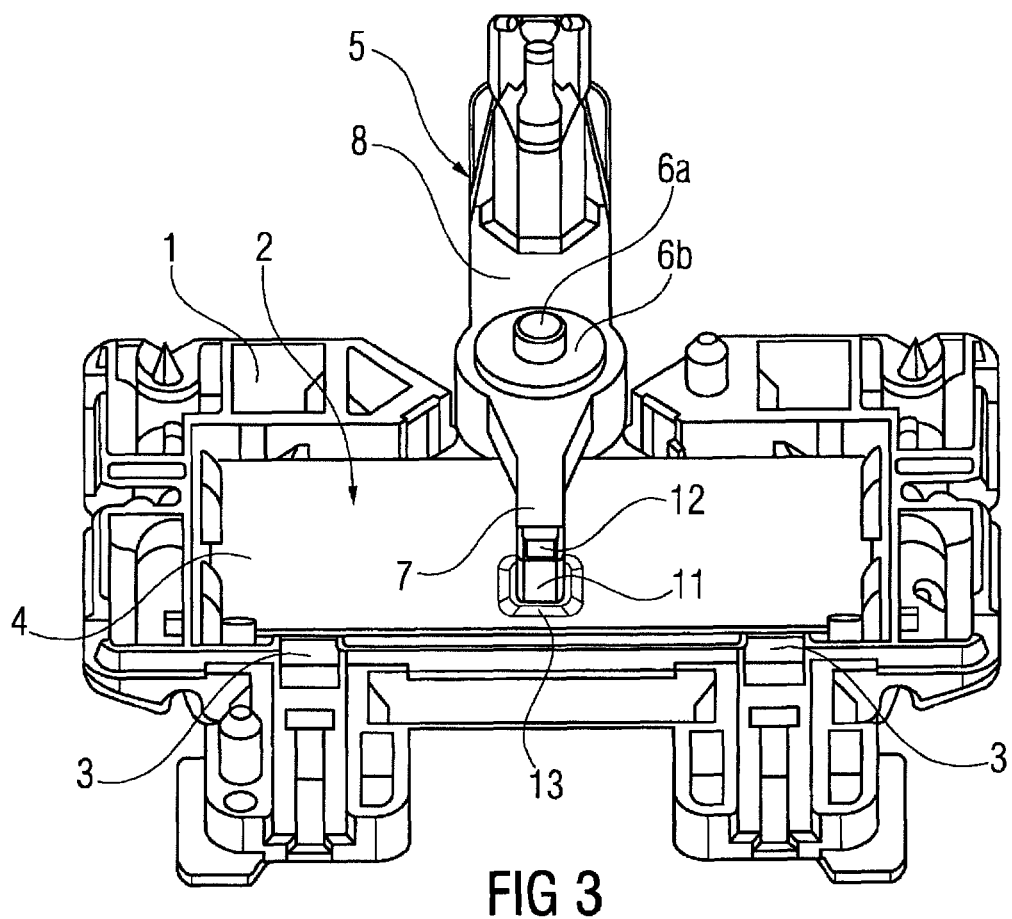
Figure 3A:
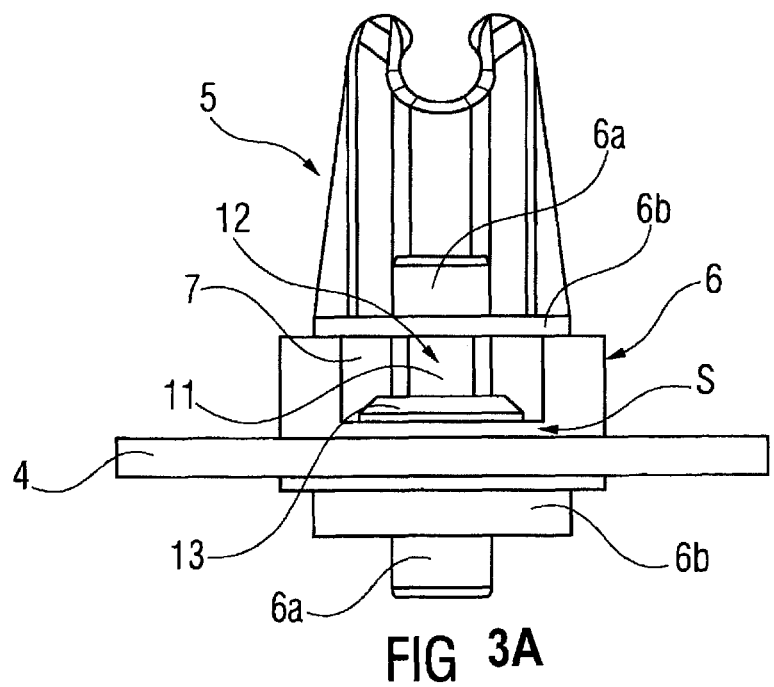

The bracket 5 in FIG. 3 differs from the bracket in FIG. 2 in that the first arm 7 has a disk-shaped widening 13 in the region of the mount 12. The disk-shaped widening 13 is arranged on the side of the bracket 5 facing the substrate 4 and parallel to the substrate 4. The disk-shaped widening 13 has a thickness of 3 mm. The disk-shaped widening 13 is formed here such that it encloses the mount 12 on the underside of the arm 7. In addition to the rectangular shape shown, the disk-shaped widening 13 can also be of round design. As illustrated in FIG. 3A, owing to the disk-shaped widening 13, the gap S has a horizontal length which is greater than the width of the arm 7. The penetration of metal particles into the horizontally extended gap S is thereby made more difficult.

Figure 4:
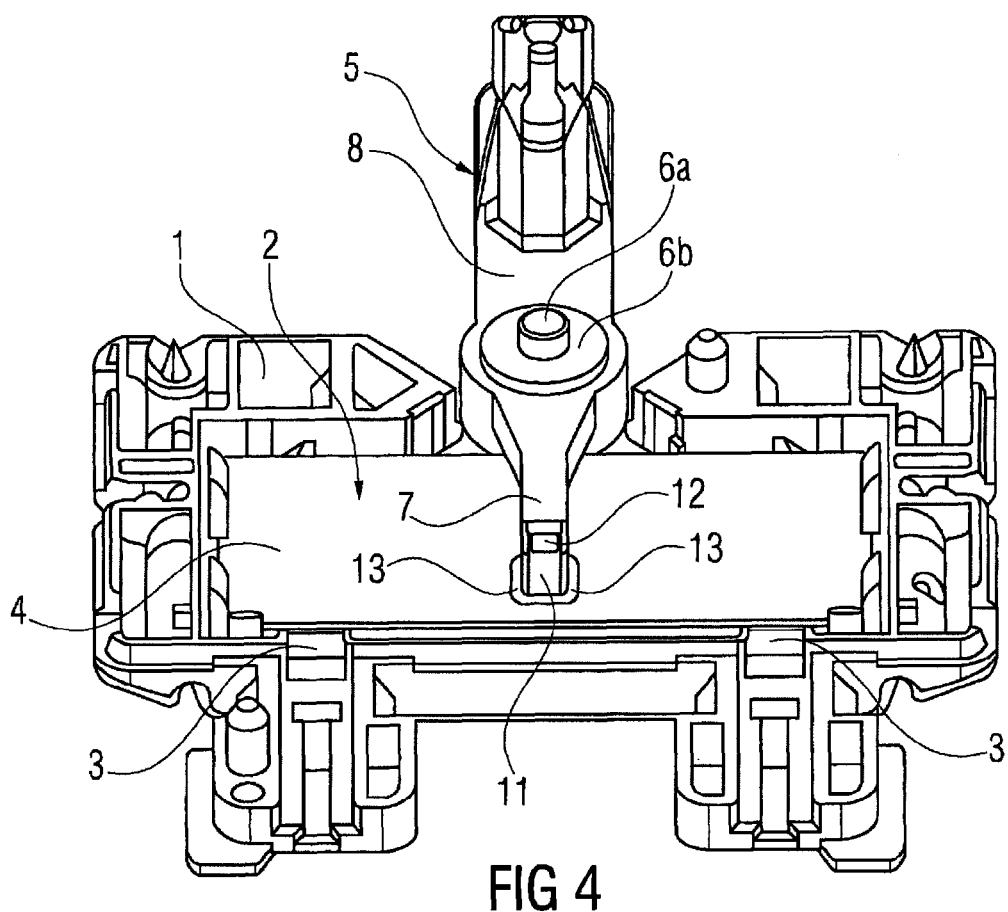
Figure 4A:
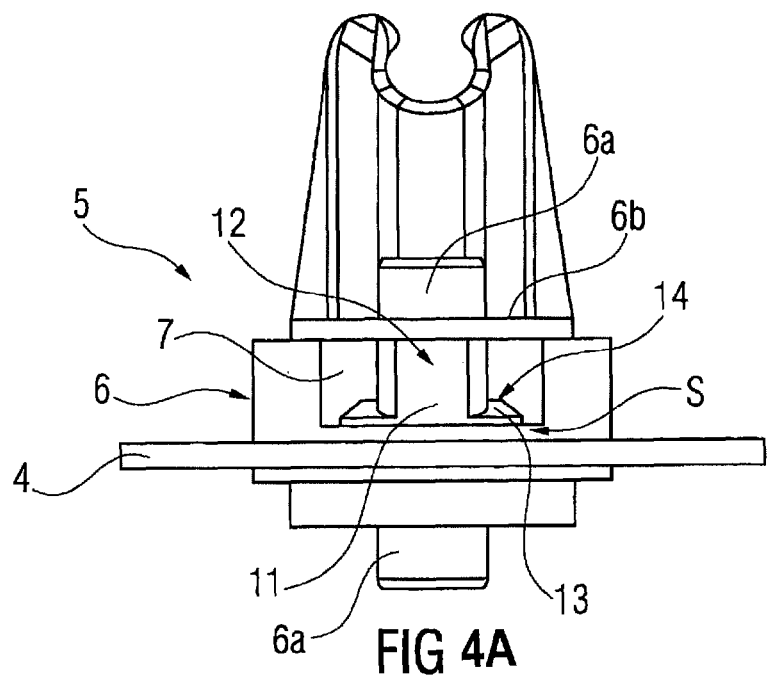

FIGS. 4, 4A show a further embodiment of the bracket 5 in which the disk-shaped widening 13 is formed in the region of the mount 12 only on the longitudinal sides of the first arm 7 of the bracket 5. The disk-shaped widening 13 thus terminates flush with the free end 11 of the first arm 7. The disk-shaped widening 13 has a chamfer 14 on its side facing away from the substrate 4. The effect of the chamfer is that metal particles flushed along by the fuel are conducted onto the outer side of the mount 12 and thus into the region of influence of the magnetic field.

This makes possible an even better discharge of the metal particles from the inlet region of the gap S on the radially outer edge of the disk-shaped widening 13. The chamfer has an angle of 40°.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A filling level indicator, comprising:
a holder (1);
a bracket (5) rotatably mounted on the holder (1);
a lever arm fastened to the bracket (5) and having a float fastened to the lever arm;
a filling level sensor arranged in the holder, the filling level sensor having:
  a substrate (4),
  a resistor network arranged on the substrate (4),
  a contact spring structure, and
  a cover connected to the substrate, the cover covering the resistor network and the contact spring structure; and
a magnet connected to the bracket or the lever arm, the magnet being configured to act on the contact spring structure such that an electrical signal corresponding to a filling level is generated according to the pivoting range of the bracket or the lever arm, wherein the bracket (5) has a mount (12) for the magnet, the mount (12) having a wall thickness penetrable by the magnetic field of the magnet such that metal particles are held on the outer side of the mount (12) by the magnetic field of the magnet, and wherein, in the region of the mount (12), the bracket (5) has a wall thickness that is 20% to 50% of the diameter of the magnet.

2. A filling level indicator, comprising:
a holder (1);
a bracket (5) rotatably mounted on the holder (1);
a lever arm fastened to the bracket (5) and having a float fastened to the lever arm;
a filling level sensor arranged in the holder, the filling level sensor having:
 a substrate (4),
 a resistor network arranged on the substrate (4),
 a contact spring structure, and
 a cover connected to the substrate, the cover covering the resistor network and the contact spring structure; and
a magnet connected to the bracket or the lever arm, the magnet being configured to act on the contact spring structure such that an electrical signal corresponding to a filling level is generated according to the pivoting range of the bracket or the lever arm, wherein the bracket (5) has a mount (12) for the magnet, the mount (12) having a wall thickness penetrable by the magnetic field of the magnet such that metal particles are held on the outer side of the mount (12) by the magnetic field of the magnet, and wherein, on the side of the bracket (5) facing the substrate (4), the mount (12) has a disk-shaped widening (13) arranged parallel to the substrate (4).

3. The filling level indicator as claimed in claim 2, wherein the disk-shaped widening (13) has a thickness of 0.5 mm to 3 mm.

4. The filling level indicator as claimed in claim 2, wherein the disk-shaped widening (13) has a radial extent that is two to four times the diameter of the magnet.

5. The filling level indicator as claimed in claim 2, wherein the disk-shaped widening (13) is at a distance from the substrate of preferably from 0.1 mm to 1.5 mm.

6. The filling level indicator as claimed in claim 2, wherein the disk-shaped widening (13) terminates flush with the side of the mount (12) facing the substrate (4).

7. The filling level indicator as claimed in claim 2, wherein the disk-shaped widening (13) is formed only on longitudinal sides of the bracket (5), and the bracket (5) extends at its free end beyond the mount (12) for the magnet.

8. The filling level indicator as claimed in claim 2, wherein the disk-shaped widening (13) has a thickness increasing from radially outward in the direction of the bracket (5) in a ramp-like manner, wherein the side of the disk-shaped widening (13) facing the substrate (4) is oriented parallel to the substrate (4).

9. The filling level indicator as claimed in claim 8, wherein the disk-shaped widening (13) has a thickness increasing in the ramp-like manner at an angle of 15°-60°.

* * * * *